March 13, 1928.
D. CROESE
1,662,302
MANUFACTURE OF STEEL AND ALLOYS FROM IRONSAND
Filed Feb. 19, 1926
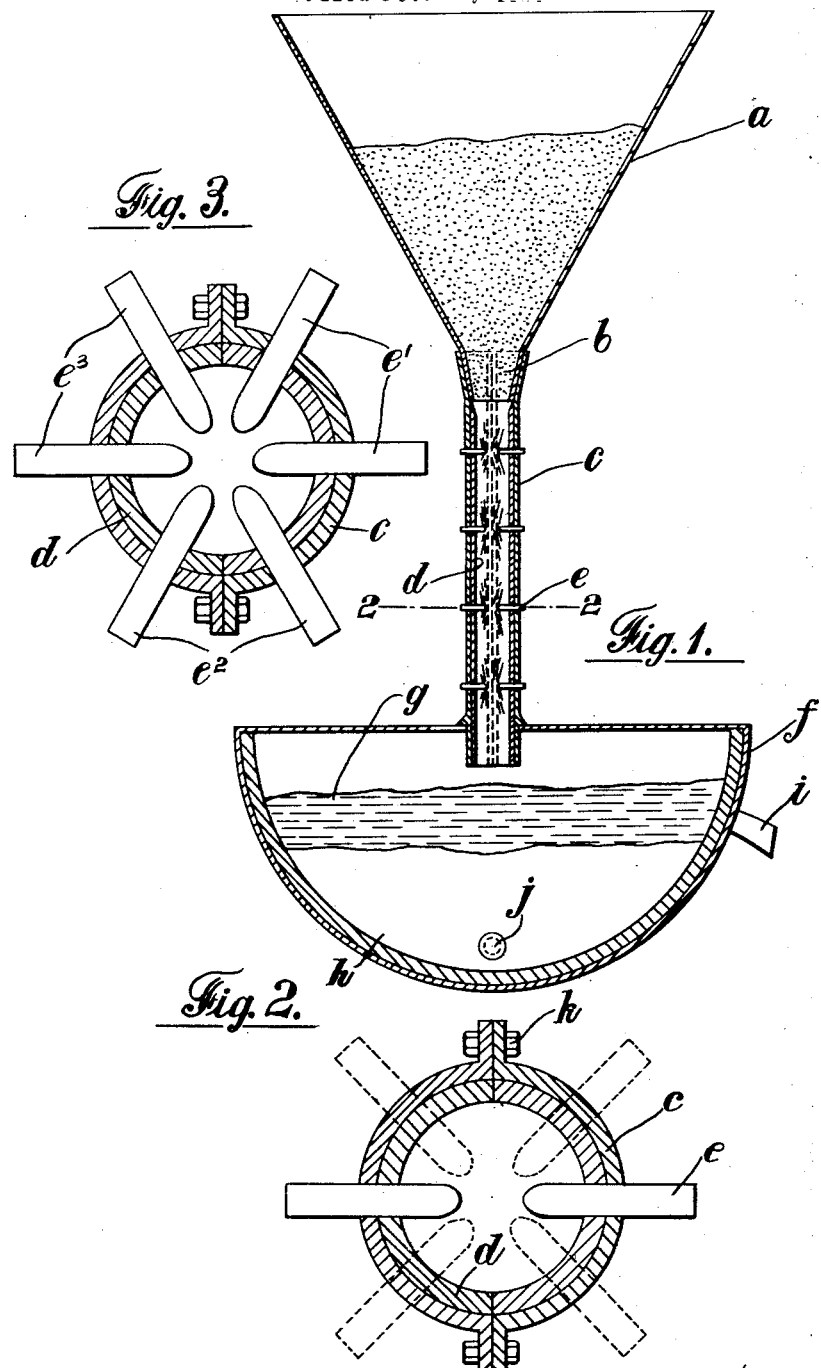
INVENTOR
Dirk Croese
by Henry Bleck
Atty Patented Mar. 13, 1928.

1,662,302

UNITED STATES PATENT OFFICE.

DIRK CROESE, OF LONDON, ENGLAND.

MANUFACTURE OF STEEL AND ALLOYS FROM IRONSAND.

Application filed February 19, 1926, Serial No. 89,300, and in Great Britain February 26, 1925.

This invention relates to the treatment of ironsand and like substances for the production of metals or alloys and has for its object to provide an improved method of treatment and improved constructions of electric arc furnace for carrying out the said method in practice.

The extraction of metals from the deposits of titaniferous ironsand which exist in great quantities in various parts of the world has hitherto been impossible on a commercial scale owing to the difficulties, first that ironsand cannot be dealt with in the blast furnace and second that the melting of a heap of ironsand in the ordinary type of electric furnace entails so great a consumption of electrical energy that production by the blast furnace from ordinary iron ore remains the cheaper commercial method of producing iron and steel.

According to the present invention, however, the difficulties hitherto experienced are overcome by treating ironsand whilst it falls by gravity through a vertical electric arc furnace which is arranged so as to provide an unobstructed path for the ironsand with or without means for guiding the falling particles to ensure passage through a series of arcs formed between pairs or groups of electrodes disposed at different stages in the height of the furnace which communicates at its base with a crucible for the reception of molten metal and slag and may itself be provided with electrodes for final treatment of the molten mass.

In the accompanying drawings:

Figure 1 is a vertical section of an apparatus suitable for carrying out the invention, Figure 2 is a cross section on the line 2—2 of Figure 1 to an enlarged scale, Figure 3 is a cross sectional view of the furnace showing another arrangement of electrodes.

Referring first to Figures 1 and 2 the apparatus comprises a hopper $a$ adapted to contain the ironsand and having sides inclined inwardly towards an outlet $b$ which opens into an electric furnace $c$ and may be provided with any suitable type of device for regulating the rate of feed. The furnace $c$ comprises a tubular conduit having a lining $d$ of graphite or other refractory material, the conduit $c$ being made preferably in two parts connected by bolts and nuts $k$ for convenience in assembly.

At intervals throughout the length of the furnace are disposed electrodes $e$ mounted and connected to a source of electrical energy in any manner usual in electric furnaces. Each pair of electrodes is disposed as shown in Figure 2 with its members 180 degrees apart so that the centre of the arc coincides with the axis of the furnace and although, for the sake of illustration the electrodes are shown in Figure 1 as disposed vertically one above another it is preferred to dispose them as indicated in Figure 2 so that each pair makes an angle of say 60 degrees with the pair next above or below it. The invention is not limited, however, to this disposition of the electrodes as any other convenient arrangement may be employed including that shown in Figure 3 wherein several pairs of electrodes $e^1$, $e^2$ and $e^3$ are disposed at one level. This arrangement may alternate with that shown in Figure 2 to ensure that the whole of the ironsand treated is compelled to pass through a number of the arcs formed between the electrodes during its descent through the furnace.

The lower end of the furnace conduit $c$ opens into a crucible $f$ which may be heated in any suitable manner to maintain the contents molten and thus separate the metals into layers in accordance with their different specific gravities and separate the metallic from other substances which form a layer $g$ of slag above the metal $h$, separate outlets $i$ and $j$ being provided at different levels for withdrawal of the separated constituents of the ironsand treated. The crucible $f$ may be provided, also, with electrodes in order to render the reduction as complete as possible.

The apparatus above described is operated in the manner now to be described. The ironsand falls in a continuous stream from the hopper $a$ into the furnace $c$, the height of which is sufficient to ensure that the particles of ironsand are exposed to the heat generated by the arcs at the electrodes $e$ or $e^1$, $e^2$ and $e^3$ for the length of time necessary to effect complete melting and reduction of all the material passed through the furnace. Whereas the melting point of the titaniferous ironsand is about 1500 degrees C. and the temperature of the electric arc is over 3000 degrees C. it follows that the particles of ironsand will be completely melted and reduced by passage through the arcs, the arrangement of which in addition to the disposition of the furnace preclude the formation of a fused mass of material which has been an obstacle hitherto to the employment of the electric furnace in treating ironsand for the production of metal. The material resulting from the treatment in the furnace *c* collects in the crucible *f* where the waste substances such as silica, line and sulphur or phosphorous compounds collect in a layer above the layers of titanium and iron.

The waste gases from the reaction which takes place in the furnace and which consist mainly in carbon monoxide may be used for preheating the sand in the hopper *a*. Also the contents of this hopper may be mixed with the necessary quantity of powdered carbon when the production of steel is required in accordance with the percentage of carbon required in the finished steel. Where the substance under treatment contains or consists of metallic oxide it is necessary to mix a suitable reducing agent with the material in the hopper *a*.

If desired the operation described above may be carried out in an inert atmosphere and for this purpose the apparatus shown would be totally enclosed and an inert gas introduced near the base of the furnace tube *c*.

I claim:—

2. An electric arc furnace for the treating of iron sand, having a vertical chamber and including a plurality of superposed electrodes arranged to provide an unobstructed path for the fall of the iron sand, and a crucible at the base of the furnace to receive molten metal and slag.

2. An electric arc furnace for the treating of iron sand, having a vertical chamber and including a plurality of pairs of electrodes disposed at different stages in the height of the furnace, said electrodes being arranged with each pair out of alignment with the remaining pairs and to afford an unobstructed path for the fall of the iron sand, and a crucible at the base of the furnace to receive molten metal and slag.

In witness whereof I affixed my signature.

DIRK CROESE.